(12) United States Patent  
Schneider

(10) Patent No.: US 9,744,616 B2  
(45) Date of Patent: Aug. 29, 2017

(54) ASSEMBLY UNIT WITH AN ASSEMBLY PIECE AND A WELDING ELEMENT, AND METHOD OF PRODUCING THE ASSEMBLY UNIT

(71) Applicant: RICHARD BERGNER VERBINDUNGSTECHNIK GMBH & CO. KG, Schwabach (DE)

(72) Inventor: Wilhelm Schneider, Rednitzhembach (DE)

(73) Assignee: Richard Bergner VerbindungstechnikGmbH & Co. KG, Schwabach (DE)

( * ) Notice: Subject to any disclaimer, the term of this patent is extended or adjusted under 35 U.S.C. 154(b) by 242 days.

(21) Appl. No.: 14/524,138

(22) Filed: Oct. 27, 2014

(65) Prior Publication Data

US 2015/0190880 A1  Jul. 9, 2015

(30) Foreign Application Priority Data

Oct. 25, 2013 (DE) .......................... 10 2013 017 675

(51) Int. Cl.
  *B23K 11/20*  (2006.01)
  *B23K 11/11*  (2006.01)
  (Continued)

(52) U.S. Cl.
  CPC .............. *B23K 11/20* (2013.01); *B21J 15/00* (2013.01); *B21K 25/00* (2013.01); *B23K 11/115* (2013.01);
  (Continued)

(58) Field of Classification Search
  CPC ........ B21J 15/00; B21K 25/00; B23K 11/115; B23K 11/20; B23K 11/34;
  (Continued)

(56) References Cited

U.S. PATENT DOCUMENTS 1,876,811 A * 9/1932 Whitworth ........... B23K 11/002
                                                    188/250 G
3,982,612 A * 9/1976 Krupka ............... F16D 65/0006
                                                    188/250 G (Continued)

FOREIGN PATENT DOCUMENTS

CN       202759348 U     2/2013
DE         3210310 A1    9/1983
(Continued)

*Primary Examiner* — James Ference
(74) *Attorney, Agent, or Firm* — Laurence A. Greenberg; Werner H. Stemer; Ralph E. Locher

(57) ABSTRACT

A mounting unit includes a mounting part for a mating surface of a basic structure which cannot be welded to the mounting part and a welding element fixed in a through-bore of the mounting part. The welding element corresponds to the bore and has a thickness at least as large as the mounting part. An annular groove is formed in the welding element. A part of the welding element bounding the groove on the outside forms a form-locking connection element expanded outward and fixing the welding element in the bore by a form-locking connection toward the mounting side. A central region radially within the annular groove is a welding surface for the mating surface, is aligned with or protrudes beyond a mounting-side edge region of the bore with an overhang and is aligned with or projects over the form-locking connection element. A production method is also provided.

20 Claims, 9 Drawing Sheets

(51) Int. Cl.
*B23K 11/34* (2006.01)
*B21K 25/00* (2006.01)
*B21J 15/00* (2006.01)
B23K 101/00 (2006.01)
B23K 101/18 (2006.01)
B23K 103/20 (2006.01)

(52) U.S. Cl.
CPC ........ *B23K 11/34* (2013.01); *B23K 2201/006* (2013.01); *B23K 2201/18* (2013.01); *B23K 2203/20* (2013.01); *Y10T 29/49833* (2015.01); *Y10T 29/49915* (2015.01); *Y10T 403/471* (2015.01)

(58) Field of Classification Search
CPC .......... B23K 2201/006; B23K 2201/18; B23K 2203/20; Y10T 403/471; Y10T 29/49833; Y10T 29/49915
USPC ............................... 188/250 G, 73.1; 29/509
See application file for complete search history.

(56) References Cited

U.S. PATENT DOCUMENTS

| | | | | |
|---|---|---|---|---|
| 5,100,050 A | * | 3/1992 | Krueger | B21J 5/00 228/193 |
| 5,129,487 A | * | 7/1992 | Kobayashi | F16D 65/092 188/250 B |
| 5,263,353 A | * | 11/1993 | Bakermans | B21D 28/06 29/874 |
| 5,739,498 A | * | 4/1998 | Sunamoto | B23K 11/0046 219/78.15 |
| 6,836,948 B2 | * | 1/2005 | Wang | B21J 15/025 219/157 |
| 7,165,312 B2 | * | 1/2007 | Vrana | B23P 19/062 29/243.5 |
| 7,870,656 B2 | * | 1/2011 | Eberlein | B21J 15/025 219/157 |
| 2005/0133483 A1 | * | 6/2005 | Hou | B23K 11/0066 219/118 |
| 2009/0294410 A1 | * | 12/2009 | Iwase | B21J 15/025 219/91.23 |
| 2013/0263429 A1 | * | 10/2013 | Koyama | B21D 39/046 29/511 |
| 2013/0270229 A1 | * | 10/2013 | Pedersen | B21J 15/02 219/106 |
| 2014/0356101 A1 | * | 12/2014 | Bassler | B23K 11/0046 411/506 |
| 2015/0190880 A1 | * | 7/2015 | Schneider | B23K 11/115 403/266 |

FOREIGN PATENT DOCUMENTS

EP 0718068 A1 6/1996
EP 0967044 A2 12/1999

* cited by examiner

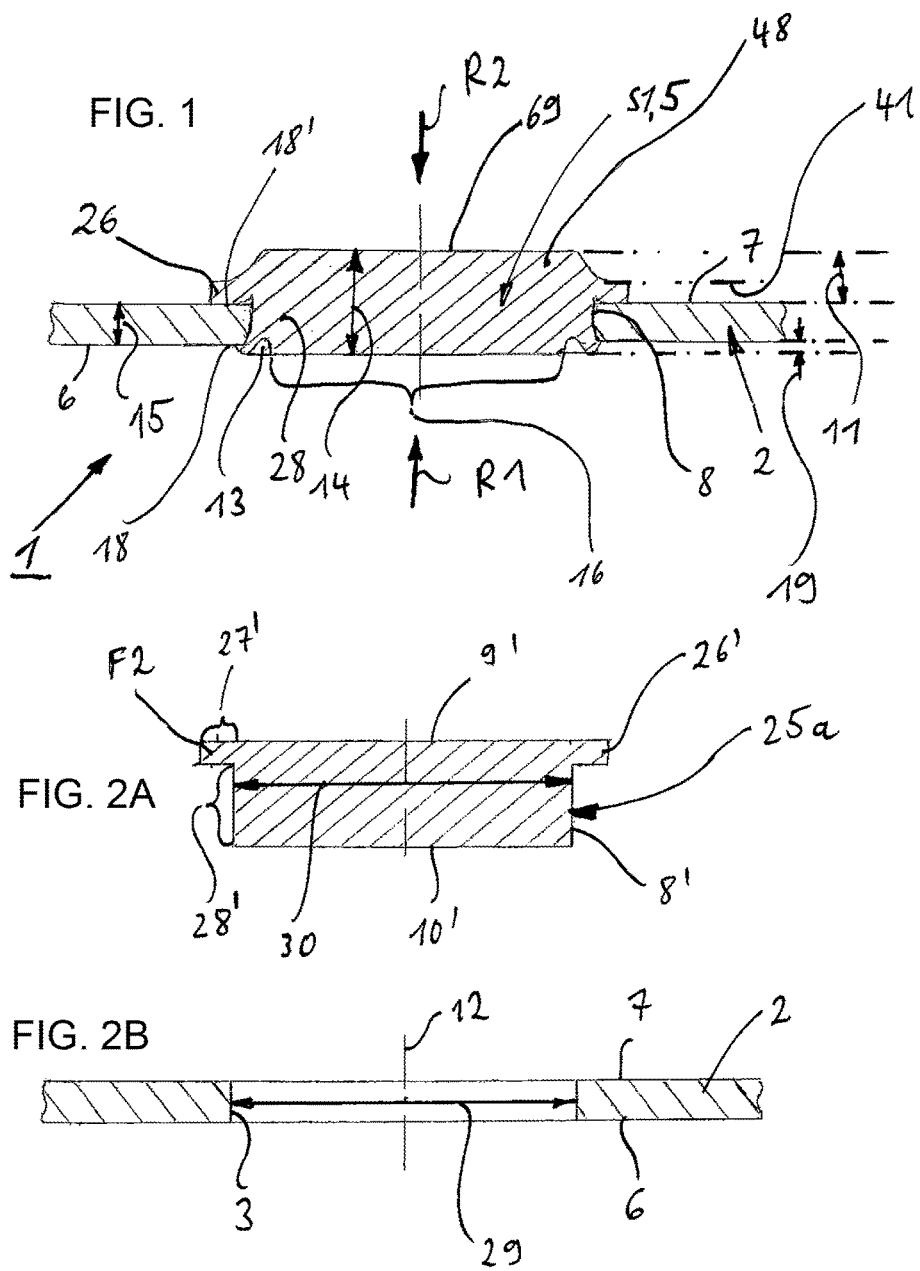

ASSEMBLY UNIT WITH AN ASSEMBLY PIECE AND A WELDING ELEMENT, AND METHOD OF PRODUCING THE ASSEMBLY UNIT

BACKGROUND OF THE INVENTION

Field of the Invention

The invention relates to a mounting unit with a mounting part and a welding element and to a method for producing the mounting unit.

The fixing of a mounting part, for example a sheet-metal-like body part to a basic structure of a motor vehicle, frequently takes place by point welding or resistance welding. In particular in automobile construction, mounting parts made of lightweight materials, such as aluminum, are used, for example, for weight saving reasons. If a mix of materials is produced which is not able to be welded, i.e. if the material of the mounting part cannot be welded to the material of the basic structure, the mounting part is provided with one or more welding elements which consist of a material which is compatible in terms of welding technology with the material of the basic structure, for example steel. The welding element is fixed in a through-bore of the mounting part, wherein the latter has a mounting side and an outer side facing away from the latter. If the mounting unit or the mounting part is fixed to a surface of the basic structure, which surface is referred to hereinafter as the mating surface, the mounting side faces said mating surface.

In the case of a mounting unit known from EP 0 967 044 A2, a disk-shaped welding element is provided, said welding element being inserted in the through-bore of the mounting part by a form-locking connection. The form-locking connection is achieved in that the inner side of the welding element, i.e. the end side thereof that faces in the same direction as the mounting side, has an annular collar which protrudes beyond the end side mentioned and is pressed radially outward into an annular recess in the wall of the through-bore. A disadvantage here is that the welding element or a welding element blank, the annular collar of which is not yet deformed in the abovementioned sense, and the mounting part have to be coordinated with each other with respect to the annular recess in the through-bore and in particular with respect to the length of the through-bore and the thickness of the welding element.

BRIEF SUMMARY OF THE INVENTION

Taking this as the starting point, it is the object of the invention to propose a mounting unit which permits a greater range of variation with respect to the mutual coordination or adaptation of mounting part and welding element or welding element blank, in particular also with regard to the use of a standard welding element blank for mounting parts of differing thicknesses. It is furthermore the object of the invention to propose a method with which mounting units of the form being discussed can be produced in a simple and cost-effective manner.

The first object is achieved by a mounting unit as described below and the second object by a method as described below.

A mounting unit according to the invention has a mounting part with a mounting side and an outer side facing away from the latter, wherein the mounting part is intended for fixing to a mating surface of a basic structure made of a material which is not able to be welded to the material of the basic structure. A welding element which is fixed in a through-bore of the mounting part and is weldable to the material of the basic structure is therefore provided for fixing the mounting part. As already mentioned above, the mounting side is that side or surface of the mounting part which faces the basic structure in the final mounting state, i.e. when the mounting unit is fixed on a basic structure by one or more welding elements.

The welding element is at least substantially a disk and therefore has a lateral or circumferential surface, an outer end side facing away from the mounting side, and an inner end side facing away from the outer side. In addition, the welding element has a preferably circular contour shape corresponding to the cross-sectional shape of the through-bore, and a thickness which is at least as large as the thickness of the mounting part in the edge region of the hole of the through-bore.

There is an annular groove in the edge region of the inner end side of the welding element, wherein that part of the welding element which bounds the annular groove radially on the outside forms a first form-locking connection element which is expanded or deformed radially outward and thereby fixes the welding element in the through-bore by a first form-locking connection in a direction facing toward the mounting side. This configuration of the first form-locking connection provides the possibility of varying the form-locking connection or the radial extent of the form-locking connection element and the radial extent of said form-locking connection by an annular groove which is adapted to the respective deformation of the first form-locking connection element being introduced into the groove-free inner end side of a welding element blank.

A central region of the inner end side, which central region is located within the annular groove, serves as a welding surface for welding the welding element to the mating surface of the basic structure. Depending on the abovementioned thickness relationship of welding element and mounting part, the central region is aligned with the mounting-side edge region of the hole or protrudes beyond the latter with a set overhang. The set overhang is dimensioned in such a manner that said central region is aligned with the first form-locking connection element or protrudes beyond the latter.

A further advantage consists in that, in order to produce the mounting unit, the starting point can basically be a simply configured, namely disk-shaped welding element blank which does not need to have any elements protruding over the outer or inner end side of said welding element blank and which are deformed to form form-locking connection elements during the production of the mounting unit. A welding element blank of this type can therefore be easily produced, for example can be punched out of sheet metal. Use may also be made of a self-punching welding element blank. The production of the through-bore in a mounting part and the fixing of the welding element blank in the mounting part can then take place in a single working step.

BRIEF DESCRIPTION OF THE SEVERAL VIEWS OF THE DRAWING

The invention together with further advantageous refinements is now explained in more detail with reference to the attached drawings, in which (predominantly in a section illustration):

FIG. 1 shows a first variant embodiment of a mounting unit,

FIGS. 2A-2E show figures which demonstrate the production of a mounting unit according to FIG. 1.

DESCRIPTION OF THE INVENTION

Figure 5:
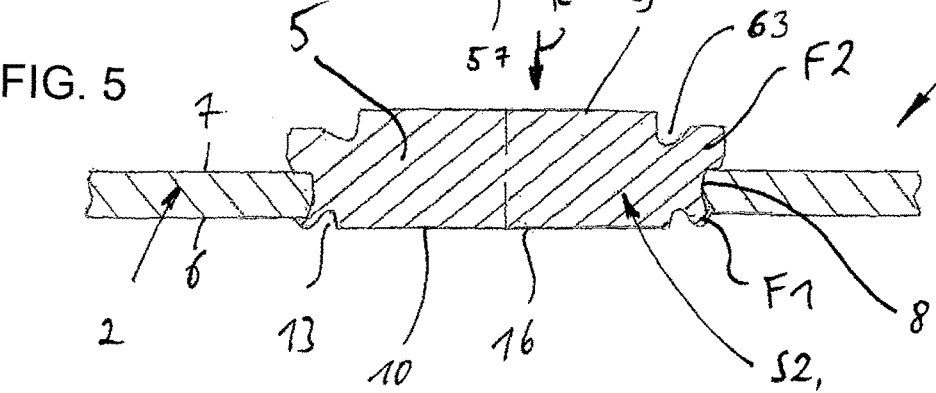
FIG. 5 shows a second exemplary embodiment of a mounting unit.

A mounting unit 1 according to FIG. 1 or FIG. 5 comprises a mounting part 2 which is preferably of sheet-metal-like configuration, and at least one welding element S which is fixed in a through-bore 3 passing through the mounting part 2. The mounting unit 1 is provided for fixing on a basic structure 4 (FIGS. 7, 8), wherein the mounting part consists of a material which is not able to be welded to the basic structure. By contrast, the welding element S consists of a material which is suitable for a welding connection to the material of the basic structure. For simplification reasons, only one through-bore 3 and a welding element S fixed therein are discussed in each case below. However, depending on the application, there may be a multiplicity of through-bores with welding elements fixed therein.

The welding element is designed as a disk 5 which, in the mounting state according to FIGS. 1 and 5, completely fills the through-bore.

Figure 8:
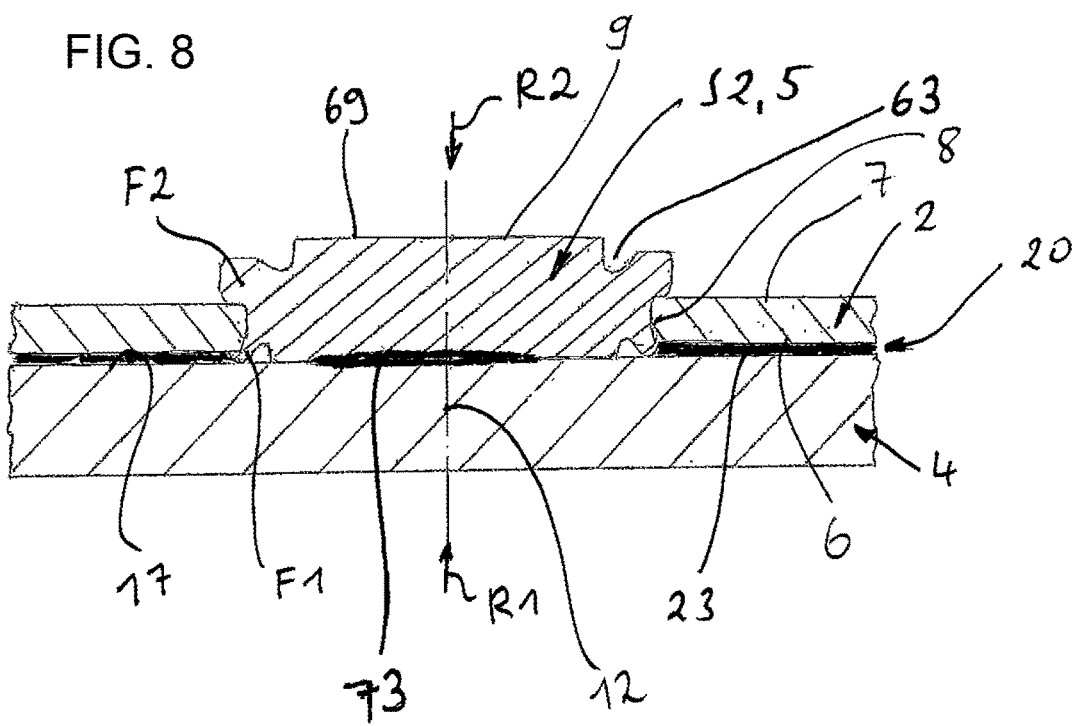
FIG. 8 shows the mounting unit from FIG. 7 in the final mounting state.

The mounting part has a mounting side 6 which faces the basic structure 4 in the final mounting state according to FIG. 8. The side opposite the mounting side 6 forms the outer side 7 of the mounting part 2. The welding element S has a circumferential surface 8 and an outer end side 9 facing away from the mounting side 6, and an inner end side 10 facing away from the outer side 7 of the mounting part 2. The contour shape of the welding element S corresponds to the cross-sectional shape of the through-bore 3. In the figures, a circular cross-sectional shape and contour shape are selected by way of example, but a differing, for example oval or polygonal, shape of the through-bore 3 and of the welding element S is also suitable.

An annular groove 13 is pressed into the edge region of the inner end side 10 of the welding element S. That part of the welding element S which bounds the annular groove 13 radially on the outside extends radially outward or is radially expanded in such a manner and thereby forms a first form-locking connection element F1 which fixes the welding element S in the through-bore 3 by a first form-locking connection in a direction R1 facing toward the mounting side 6. In order to form the first form-locking connection, the first form-locking connection element F1 radially overlaps a rear engagement surface of the mounting part 2, which rear engagement surface runs transversely with respect to the central longitudinal axis 12 of the through-bore 3 and faces away from the outer side 7. The rear engagement surface is, for example, a step or radial shoulder (not shown) arranged within the through-bore, preferably the inner-side edge region 18a of the hole of the through-bore 3.

The thickness 14 of the welding element S is greater than the thickness 15 of the mounting part 2. The welding element S therefore protrudes with an overhang 11 at least from the outer side 7 of the mounting part 2. A central region 16 of the inner end side of the welding element S, which central region is located radially within the annular groove 13, serves as a welding surface for the integrally bonded connection or welding to the mating surface 17 of a basic structure 4. The central region 16 is aligned with the mounting-side edge region 18a of the hole of the mounting part 2 or protrudes beyond the latter with a set overhang 19. The set overhang 19 serves, in the final mounting state between the mounting part 2 and the mating surface 17 of the basic structure 4, to provide a defined gap 20 in which a material layer 23 can be arranged, for example, for adhesive bonding or insulating purposes (FIG. 8).

Apart from the abovementioned first form-locking connection element F1, the welding element S also has a second form-locking connection element F2. With the latter, said welding element is fixed in the through-bore 3 by a second form-locking connection in a direction R2 facing toward the outer side. Decisive importance is attached to the second form-locking connection or the second form-locking connection element F2 with respect to the strength of the connection of the mounting part 2 to the basic structure 4. The second form-locking connection element F2 is therefore correspondingly configured to be more stable than the first form-locking connection element F1. In order to form the second form-locking connection, said second form-locking connection element preferably radially overlaps a rear engagement surface of the mounting part 2, which rear engagement surface runs transversely with respect to the central longitudinal axis 12 of the through-bore 3 and faces away from the mounting side 6 of the mounting part 2. The rear engagement surface is, for example, a step or radial shoulder (not shown) arranged within the through-bore, preferably the edge region 18b of the hole of the through-bore 3.

The second form-locking connection element F2 is either only produced on the welding element blank 25b during the production of the mounting unit 1 or is already present on a welding element blank 25a used for the production of the mounting unit 1. In the latter case, the second form-locking connection element F2 is a flange 26' which is integrally formed in the region of the outer end side 9' of the welding element blank 25a, wherein the outer side 27' of said flange is aligned with the end side 9' of the welding element blank 25a. That longitudinal section of the welding element blank 25a which adjoins the flange 26' in the direction R2 and is referred to below as shaft 28' has a circular-cylindrical circumferential surface 8'.

Irrespective of whether use is made of a welding element blank 25a, b which is flangeless or is provided with a flange 26', said welding element blank preferably has a thickness 14' which is dimensioned in such a manner that said welding element blank is suitable for producing mounting units having mounting parts 2 of differing thickness.

In order to produce a mounting unit 1 using a welding element blank 25a having a flange 26', according to FIG. 2A, a mounting part 2 is provided, the through-bore 3 of which has a diameter 29 which is slightly larger than the diameter 30 of the shaft 28' of the welding element blank 25a. The relationship between the diameters mentioned can be, for example, such that there is a parting line 33 between the circumferential surface 8' of the shaft 28' and the wall of the through-bore 3.

Figure 2C:
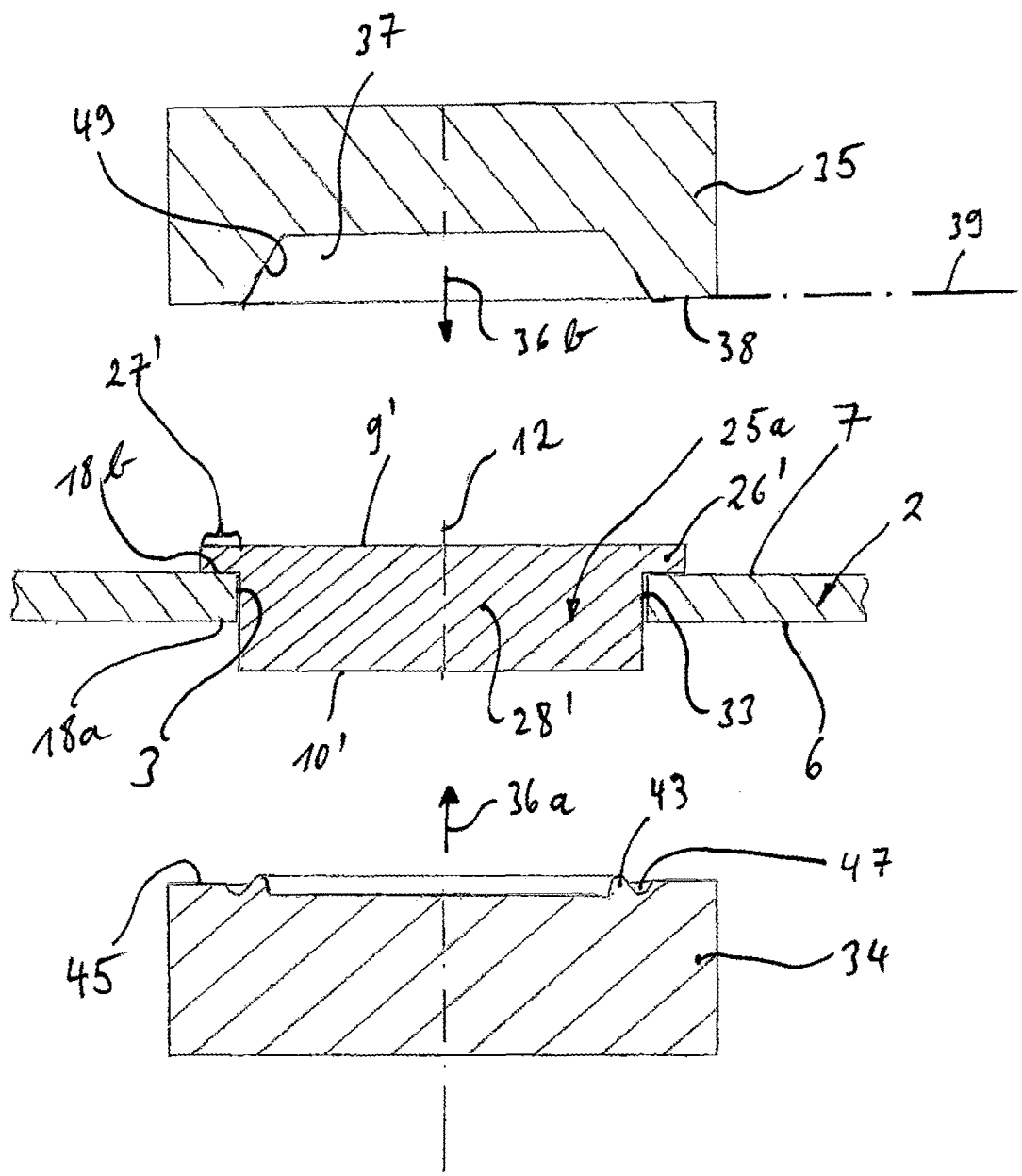
Figure 2D:
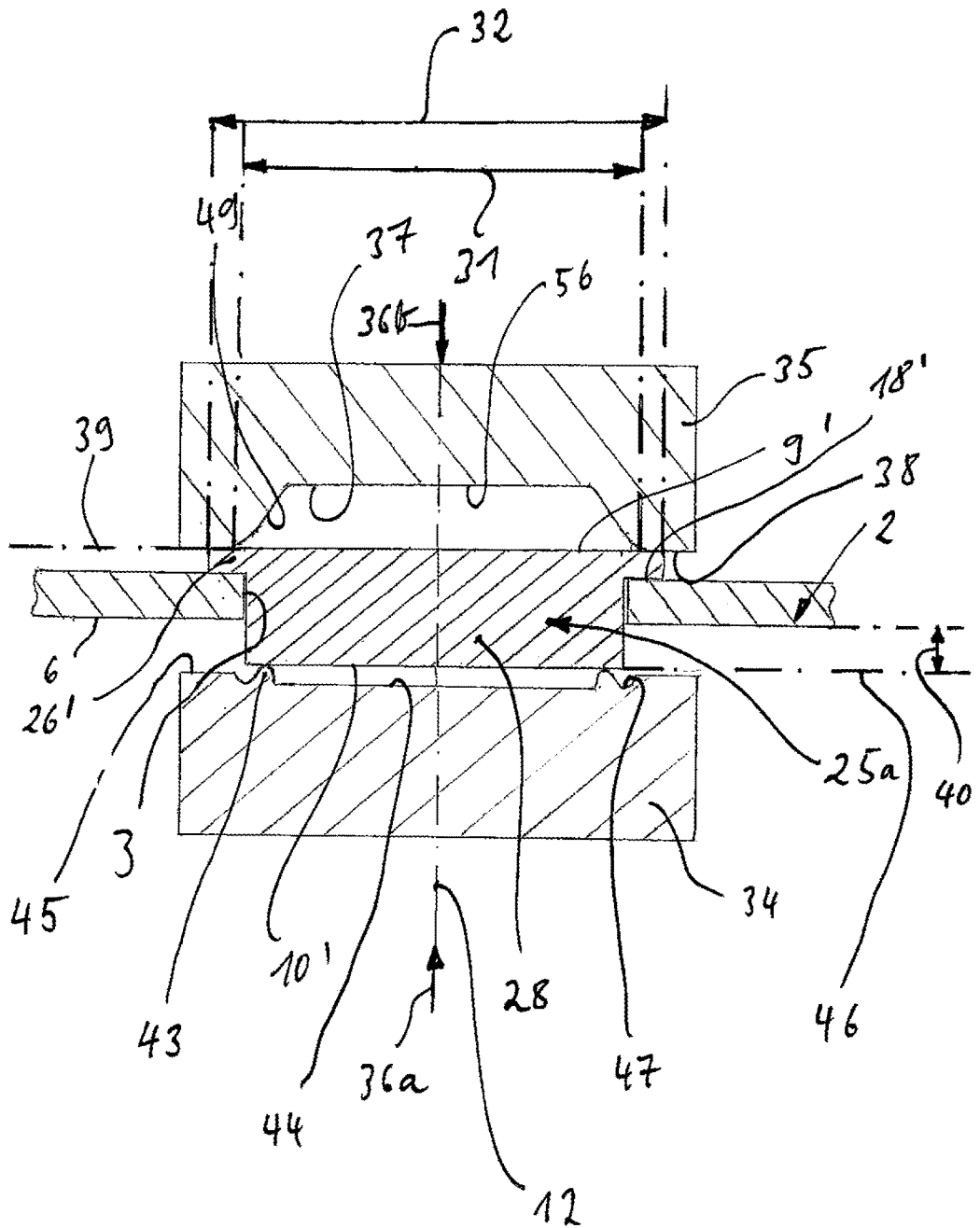

As can be gathered from FIG. 2C, the welding element blank 25a is introduced by its shaft 28' into the through-bore 3 in such a manner that the flange 26' rests with the lower side thereof on the outer-side edge region 18b of the hole of the through-bore 3 or on the outer side 7 of the mounting part 2. The mounting part 2, which is positionally fixed in an expedient manner, is then approached from the mounting side 6 thereof by a first punch 34 in a first stroke direction 36a and, from the outer side 7 thereof, by a second punch 35 in a second stroke direction 36b (FIG. 2C). At the end of the feeding movement of the punches 34, 35, said punches bear against the outer end side 9' and the inner end side 10' of the welding element blank 25a (FIG. 2D).

The second punch 35 has a central recess 37 which is bordered by an annular punch surface 38. The punch surface 38 runs in a plane 39 which runs parallel to the outer end side 9' or to the outer side 27' of the flange of the welding element blank 25 and to the outer-side edge region 18b of the hole of the through-bore 3. The inside diameter 31 of the punch surface 38 is smaller than the diameter 32 of the flange 26', and is preferably the same size or smaller than the diameter 29 of the through-bore. When the second punch 35, as shown in FIG. 2D, acts upon the welding element blank 25a, the flange 26' of said welding element blank is clamped between the punch surface 38 and the mounting part 2. The shaft 28' of the welding element blank 25a protrudes with an overhang 40 from the mounting side 6 of the mounting part 2.

That side of the first punch 34 which faces the mounting part 2 has an annular projection 43 for stamping the annular groove 13 into the inner end side 10' of the welding element blank 25a. Said annular projection bounds a flat surface region 44. The, for example distance-controlled, advance of the first punch 34 in the first stroke direction 36a brings about a first and a second deformation of the welding element blank 25a.

During the first deformation, the annular projection 43 is pressed into the inner end side 10' of the welding element blank 25a, with the annular groove 13 being formed, wherein part of the material of said welding element blank is displaced substantially radially outward, forming the first form-locking connection element F1. At the same time as said displacement of material, the first form-locking connection element F1 is shaped, wherein this is achieved by the following configuration: the first punch 34 has a flat stop surface 45 concentrically engaging around the annular projection 43, wherein, during the stamping operation according to FIG. 2D, said stop surface runs parallel to the mounting side 6 of the mounting part 2 and parallel to a plane 46 spanned by the annular projection 43. That region of the first punch 34 which is present between the stop surface 45 and the annular projection 43 is formed by an annular recess 47. When the first punch 34 is advanced from the situation shown in FIG. 2D in the stroke direction according to arrow 36a, material of the welding element blank 25a is displaced into the annular recess 47 by the annular projection 43, wherein the first form-locking connection element F1 is formed with a shape complementary to the annular recess 47. At the end of the stroke of the punch in the first stroke direction 36a, the stop surface 45 of the first punch 34 bears against the mounting side 6 of the mounting part 2.

Figure 2E:
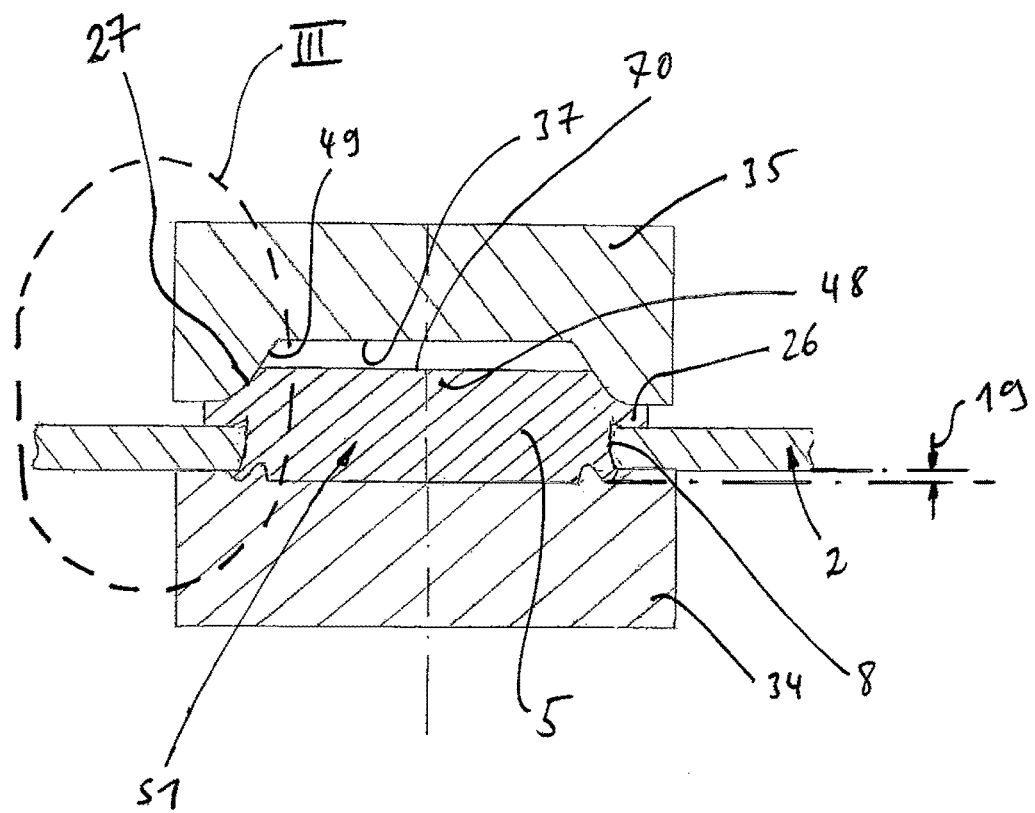

The second deformation serves to reduce the mounting-side overhang 40 of the welding element blank 25a to the set overhang 19 at the end of the stamping operation (FIG. 2E). For this purpose, the shaft 28' of the welding element blank 25a is pressed during the advance of the first punch 34 and the formation of the first form-locking connection element F1 into the through-bore 3 until the set overhang 19 is reached, i.e. the central region 16 on the inner end side 10' of the welding element blank 25a is at a corresponding axial distance from the mounting side 6 of the mounting part 2. The material of the shaft 28' that is displaced during the reduction of the overhang 40 is displaced into the recess 37 of the second punch 35, with a projection 48 being formed on the outer end side 9' of the welding element blank 25a (FIG. 2E). In order to facilitate said displacement of material, the side wall 49 of the recess 37 of the second punch 35 is in the shape of a funnel opening toward the punch surface 38.

Figure 3A:
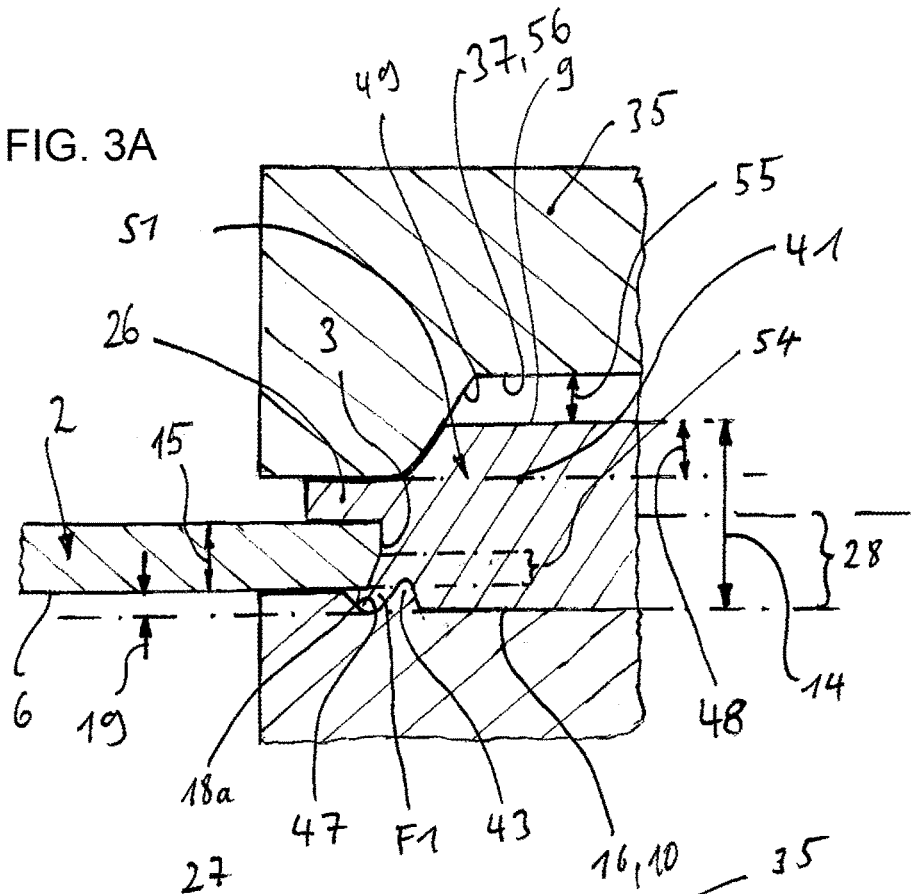
FIG. 3A shows the detail III in FIG. 2E.
Figure 3B:
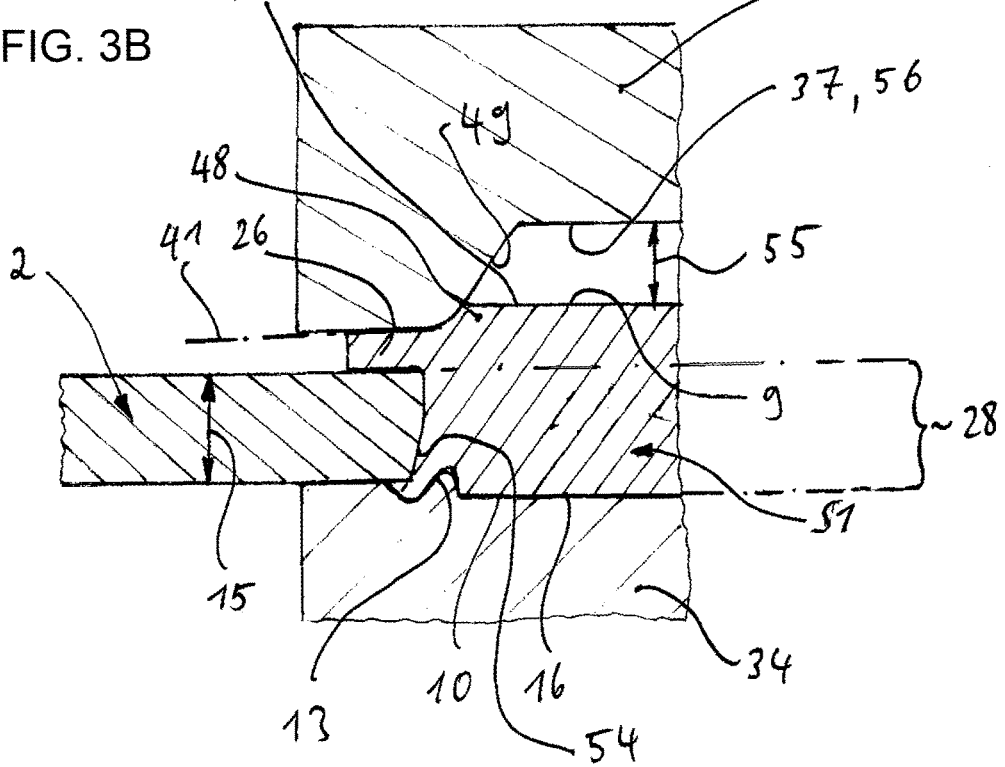
FIG. 3B shows a partial view, corresponding to the detail III, of a mounting unit with a thicker mounting part than FIG. 3A.

The punch surface 38 preferably extends radially inward to an extent such that the entire outer side 27 is covered by the punch surface 38 or is pressed against the outer side 7 of the mounting part during the stamping operation (FIGS. 3A, B). It is thereby ensured that, because of the displacement of the shaft 28' in the first stroke direction 36a, the flange 26' does not shear off. At the end of the stamping operation, the shaft 28 of the resulting welding element is shortened to a greater or lesser degree depending on the thickness 15 of the mounting part 2. In the exemplary embodiment shown in FIG. 3B, the mounting part 2 has a greater thickness 15 than that of FIG. 3A. In this case, the overhang 40, by which the welding element blank 25a protrudes from the mounting side 6 of the mounting part according to FIG. 2D, is smaller than in the case of the thinner mounting part of FIG. 3A. Accordingly, the quantity of material of the shaft 28' that has to be displaced into the recess 37 of the second punch 35 is smaller, and the axial distance 55 between the outer end side 9 of the welding element S and the base 56 of the recess 37 is greater than in the exemplary embodiment of FIG. 3A.

In the exemplary embodiment of FIG. 1, the form-locking connection of the first form-locking connection element F1, which form-locking connection is effective in the direction R1, is achieved in that the form-locking connection element F1 radially overlaps the mounting-side edge region 18a of the hole. Depending on the hardness of the material used for the mounting part 2, it may happen, during the formation of the form-locking connection element F1, that at least one longitudinal section 54 of the wall of the through-bore 3, which longitudinal extension extends away from the mounting side 6, is widened radially during the formation of the first form-locking connection element F1, forming, for example, a cone opening toward the mounting side 6, which brings about a single or additional form-lockingly connected fixing of the welding element S in the through-bore 3, the additional form-lockingly connected fixing being added to the form-locking connection by overlapping.

Figure 4:
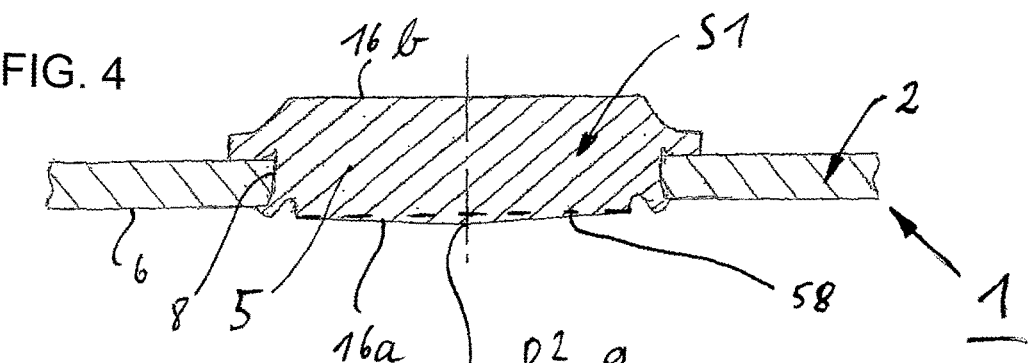
FIG. 4 shows a variant of the exemplary embodiment of FIG. 1.

FIG. 4 shows an exemplary embodiment in which the central region 16a does not run in a plane 58, but rather is designed in the form of a cone, the cone point 57 of which faces away from the mounting side 6 of the mounting part 2. The advantage of this configuration is that, during the welding of the welding element S to the mating surface 17 of a basic structure 4, there is a high density of welding current because of the small contact surface in the region of the cone tip 57. This brings about rapid melting of the material in the region of the cone tip 57, wherein the melting operation then rapidly expands to the entire central region 16a of the welding element S.

In the exemplary embodiment shown in FIG. 5, the second form-locking connection in the through-bore 3, in a direction R2 facing toward the outer side 7 of the mounting part 2, is likewise brought about by a second form-locking connection element F2. However, the latter is not a radially protruding flange which is already present on the welding element blank 25b. On the contrary, the second form-locking connection element F2, like the form-locking connection element F1, is produced by displacement of material during the production of a mounting unit. Accordingly, there is an annular groove 63 in the edge of the outer end side 9 of the welding element S2. The second form-locking connection element F2 is of flange-like design and, like the flange 26 of the above-described exemplary embodiment, overlaps the outer-side edge region 18b of the hole of the through-bore 3.

In order to produce a mounting unit 1 with a welding element S2, the starting point is the circular cylindrical welding element blank 25b which, although it likewise has an outer end side 9', an inner end side 10' and a circumferential surface 8', does not have any structures whatsoever protruding from the sides mentioned, for example a flange. A mounting part 2 is provided, the through-bore 3 of which has a diameter 29 which is slightly larger than the diameter 64 of the welding element blank 25b. The relationship between the diameters mentioned can be, for example, such that there is a parting line 33 between the circumferential surface 8' and the wall of the through-bore 3.

The fixing takes place with the aid of the first punch 34 and a second punch 35a which are brought from the mounting side 6 and the outer side 7 of the mounting part in the stroke directions 36a, 36b up to the welding element blank 25b, which is located in the through-opening, and are subsequently pressed against the outer and inner end side 9', 10'. In the process, as described above, the first form-locking connection element F1 is formed. The second form-locking connection element F2 is produced in an analogous manner by an annular projection 65 on a side of the second punch 35a that faces the mounting part 2 being pressed into the outer end side 9' of the welding element blank 25b. In the process, the annular groove 63 and, by means of a substantially radially outwardly directed displacement of material, the second form-locking connection element F2 are formed. The annular projection 65 is designed in such a manner that the displaced material or the second form-locking connection element F2 radially overlaps the outer-side edge region 18b of the hole of the mounting part, with the second form-locking connection being formed.

The annular projection 65 bounds a recess 66. An annular surface region 67 adjoining the annular projection radially outwards runs parallel to the base of the recess 66 and parallel to the outer side 7 of the mounting part 2. The surface region 67 is spaced apart from the base 68 in the stroke direction 36b. This ensures an obstruction-free entry of the annular projection 65 into the outer end side 9' of the welding element blank 25b. In addition, the configuration being discussed causes the outer end side 9 of the welding element S2 to have a raised central region which forms a contact surface 69 for a welding electrode 70 and protrudes beyond the second form-locking connection element F2 in the stroke direction 36a. The central region is that part of the outer end side 9 of the welding element which is located radially within the annular projection 63. This configuration ensures that the welding electrode 70 can be fitted onto the contact surface 69 with a lateral offset without the second form-locking connection element F2 being contacted by the welding electrode 70 and being subjected to an undesirable thermal loading.

Also in the exemplary embodiment described further above, the welding element S1 has a contact surface 69 on the projection 48 of the welding element S1, which contact surface protrudes beyond the second form-locking connection element F2 in the stroke direction 36a. A laterally offset fitting of a welding electrode 70 is therefore also possible here without said welding electrode contacting the second form-locking connection element F2 or the flange 26.

Figure 7:
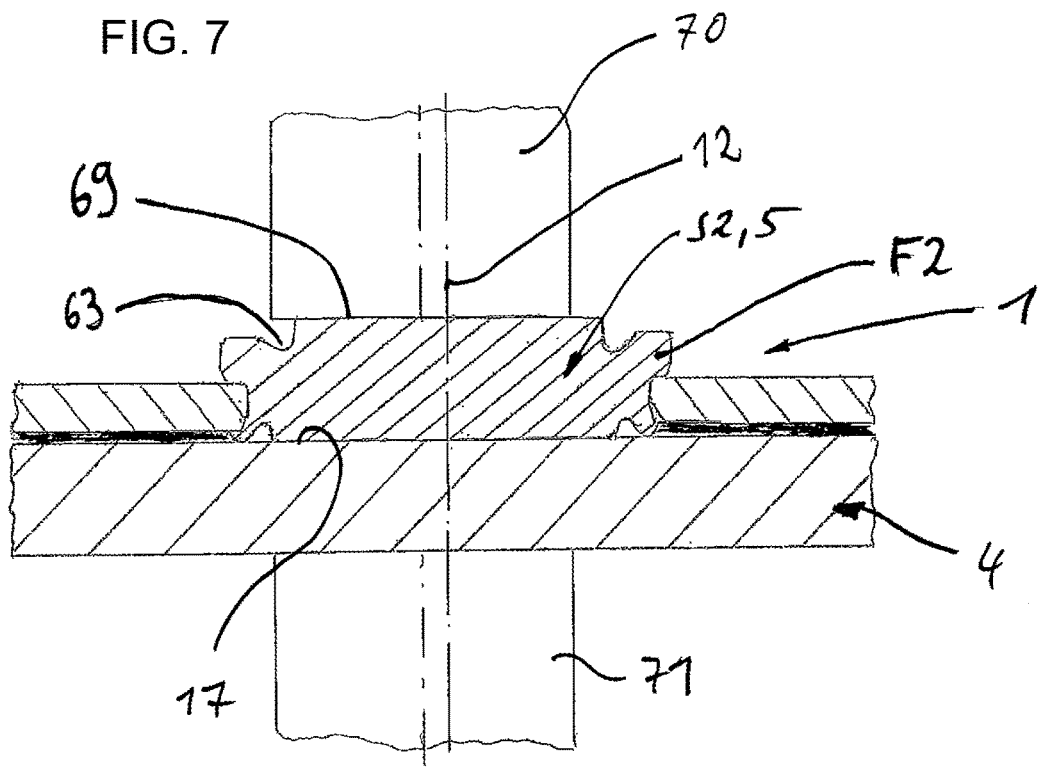
FIG. 7 shows the welding of a mounting unit according to FIG. 5 to a basic structure.

As FIG. 7 shows, in order to connect a mounting unit 1 to the basic structure 4, a second welding electrode 71 is fitted onto said basic structure in such a manner that a welding zone 73 which is approximately concentric with respect to the central longitudinal axis 12 of the through-bore 3 is produced.

Figure 6A:
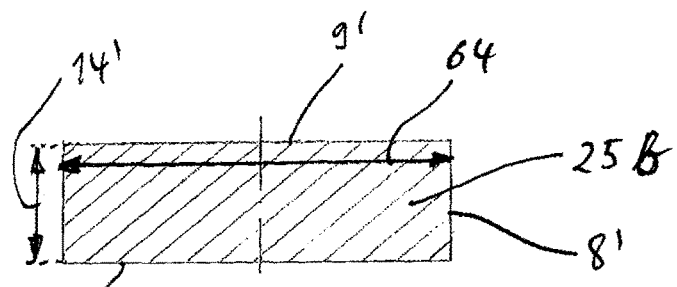
FIGS. 6A-6D show figures which clarify the production of the mounting unit according to FIG. 5.
Figure 6B:
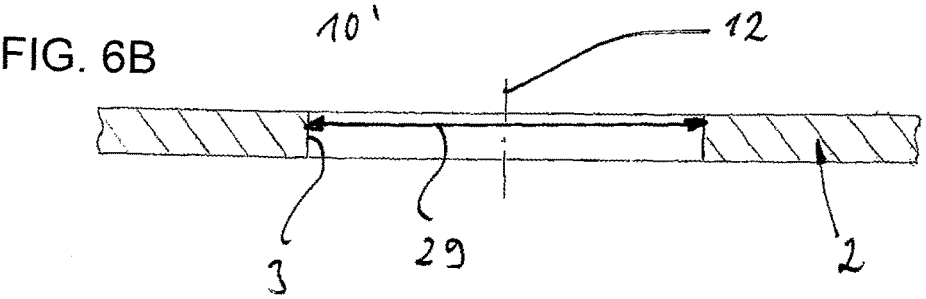
Figure 6C:
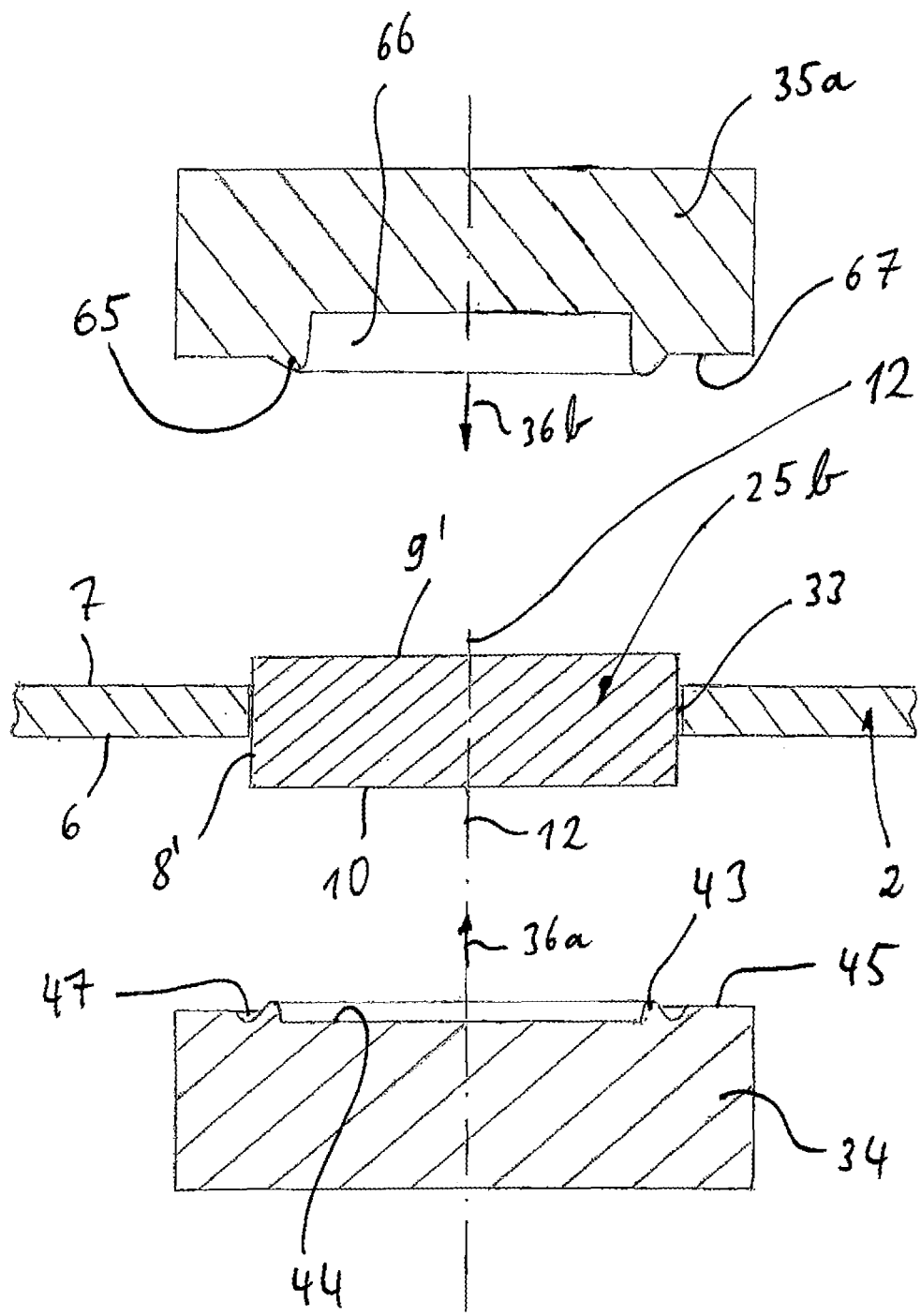
Figure 6D:
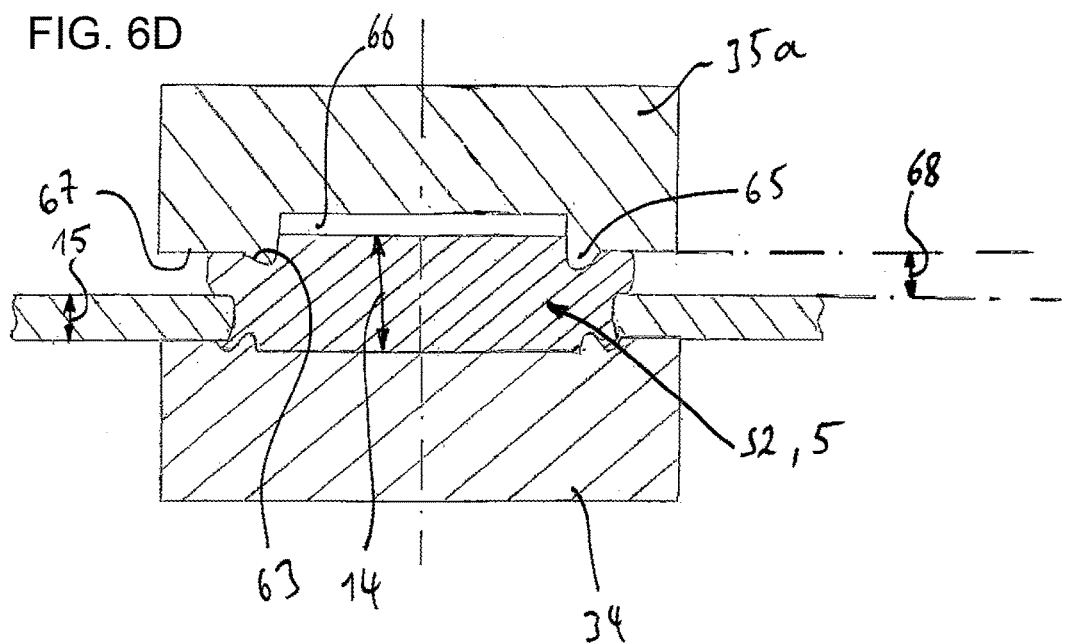
Figure 6E:
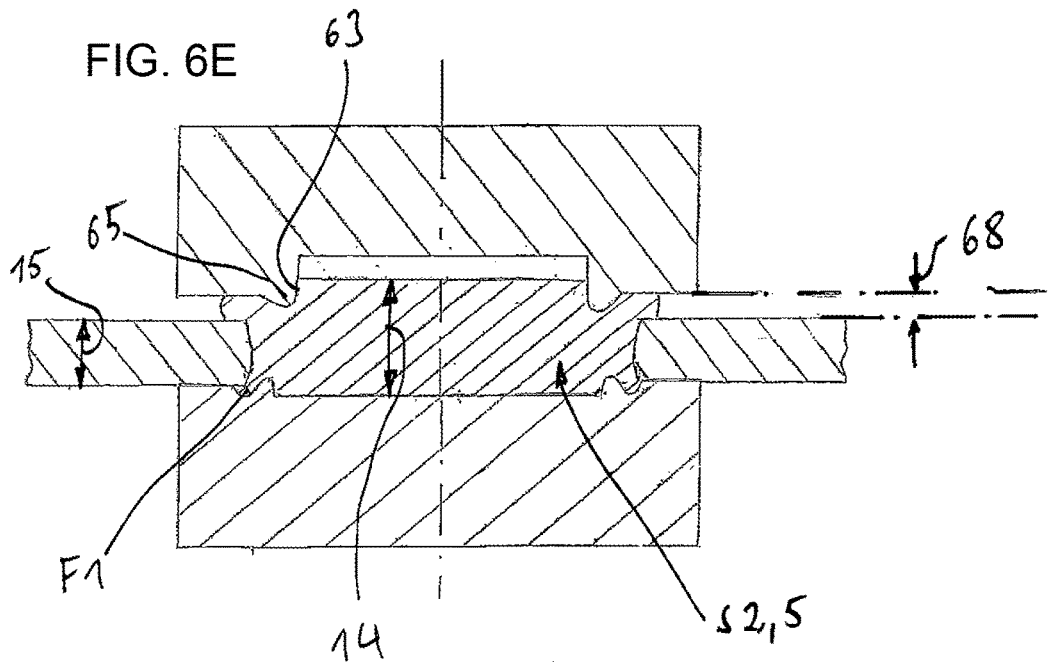
FIG. 6E shows a figure comparable to FIG. 6D, but wherein the mounting unit has a mounting part of greater thickness.

The welding element blank 25b has a thickness 14' which permits the production of mounting units 1 having mounting parts 2 of differing thickness 15. As can be seen from a comparison of FIGS. 6D and 6E, with the same thickness 14 of the welding element S2, which thickness corresponds to the thickness 14' of the welding element blank 25b, the axial length 68 of the second form-locking connection element F2 is all the greater, the smaller the thickness 15 of the mounting part 2.

LIST OF REFERENCE NUMBERS

1 Mounting unit
2 Mounting part
3 Through-bore
4 Basic structure
5 Disk
6 Mounting side
7 Outer side
8 Circumferential surface (of 5)
9 Outer end side (of 5)
10 Inner end side (of 5)
11 Overhang
12 Central longitudinal axis (of 3)
13 Annular groove
14 Thickness (of 5)
15 Thickness (of 2)
16 Central region
17 Mating surface
18 Edge region of the hole
19 Set overhang
20 Gap
23 Material layer
24 Flange
25 Welding element blank
26 Flange
27 Outer side (of 26)
28 Shaft
29 Diameter (of 3)
30 Diameter (of 28)
31 Inside diameter (of 38)
32 Diameter (of 26)
33 Parting line
34 First punch
35 Second punch
36 Stroke direction
37 Recess
38 Punch surface
39 Plane
40 Overhang
41 Plane (of 26')
43 Annular projection
44 Surface region
45 Stop surface
46 Plane
47 Annular recess
48 Projection
49 Side wall (of 37)

54 Longitudinal section (of 3)
55 Axial distance
56 Base
57 Cone point
58 Plane
63 Annular groove
64 Diameter (of S2)
65 Annular projection (on 35a)
66 Recess (in 35a)
67 Surface region
68 Axial length (F2)
69 Contact surface
70 Welding electrode
71 Welding electrode
73 Welding zone

The invention claimed is:

1. A mounting unit, comprising:
a mounting part formed of a material and configured to be fixed to a mating surface of a basic structure formed of a material not able to be welded to said material of said mounting part, said mounting part having a thickness, a mounting side and an outer side facing away from said mounting side, and said mounting part having a through-bore formed therein with a cross-sectional shape and a hole-edge region; and
a welding element fixed in said through-bore and being a disk having a circumferential surface, an outer end side facing away from said mounting side and an inner end side facing away from said outer side, said welding element having a contour shape corresponding to said cross-sectional shape of said through-bore and a thickness being at least as large as said thickness of said mounting part in said hole-edge region of said through-bore;
said inner end side of said welding element having an edge region with an annular groove formed therein defining a part of said welding element bounding said annular groove radially outwardly for contacting the mating surface of the basic structure and forming a first form-locking connection element being expanded radially outwardly and fixing said welding element in said through-bore with a first form-locking connection in a direction facing toward said mounting side;
said inner end side of said welding element having a central region located radially within said annular groove and serving as a welding surface for welding said welding element to the mating surface of the basic structure;
said central region being aligned with or protruding beyond said hole-edge region of said through-bore at said mounting side with a set overhang; and
said central region being aligned with or projecting over said first form-locking connection element.

2. The mounting unit according to claim 1, wherein said first form-locking connection element widens conically in a direction opposed to said direction of said first form-locking connection to form said first form-locking connection.

3. The mounting unit according to claim 1, wherein:
said mounting part has a rear engagement surface running transversely to a central longitudinal axis of said through-bore and facing away from said outer side; and
said first form-locking connection element radially overlaps said rear engagement surface of said mounting part to form said first form-locking connection.

4. The mounting unit according to claim 3, wherein said rear engagement surface is said hole-edge region of said through-bore at said mounting side.

5. The mounting unit according to claim 1, wherein said welding element has a second form-locking connection element fixing said welding element in said through-bore with a second form-locking connection in a direction facing toward said outer side.

6. The mounting unit according to claim 5, wherein:
said mounting part has a rear engagement surface running transversely to a central longitudinal axis of said through-bore and facing away from said mounting side; and
said second form-locking connection element radially overlaps said rear engagement surface of said mounting part to form said second form-locking connection.

7. The mounting unit according to claim 6, wherein said second form-locking connection element overlaps said hole-edge region of said through-bore at said outer side.

8. The mounting unit according to claim 1, wherein said outer end side of said welding element has an edge region with an annular groove, and a part of said welding element bounding said annular groove radially outwardly forms a second form-locking connection element.

9. The mounting unit according to claim 1, wherein said outer end side of said welding element has a raised central region forming a contact surface for a welding electrode.

10. The mounting unit according to claim 1, wherein said welding element is a self-punching welding element.

11. A method for producing a mounting unit, the method comprising the following steps:
providing a mounting part formed of a material, configured to be fixed to a mating surface of a basic structure formed of a material not able to be welded to the material of the mounting part, and having a thickness, a mounting side, an outer side facing away from the mounting side and a through-bore with a cross-sectional shape and a hole-edge region; and
fixing a welding element in the through-bore of the mounting part by:
placing, in the through-bore, a welding element blank being a disk with a circumferential surface, an outer side, an inner end side with an edge region, a contour shape corresponding to the cross-sectional shape of the through-bore and a thickness being at least as large as the thickness of the mounting part in the hole-edge region of the through-bore;
pressing an annular projection of a first punch advanced in a first stroke direction facing toward the mounting side of the mounting part into the edge region of the inner end side of the welding element blank forming an annular groove, causing a part of the welding element blank adjoining the annular groove radially outwardly to form a radially outwardly expanded first form-locking connection element for contacting the mating surface of the basic structure the form-locking connection element fixing the welding element in the through-bore with a form-locking connection in a direction facing toward the mounting side of the mounting part and defining a central region of the welding element within the annular groove;
aligning the central region with the mounting side hole-edge region or causing the central region to protrude beyond the mounting side hole-edge region with a set overhang; and
aligning the central region with the first form-locking connection element or projecting the central region over the first form-locking connection element.

12. The method according to claim 11, which further comprises providing the first punch with a stop surface engaging around the annular projection, running parallel to a plane spanned by the annular projection and bearing against the mounting side of the mounting part at an end of a stroke of the punch, and forming a region of the first punch located between the stop surface and the annular projection as an annular recess.

13. The method according to claim 11, which further comprises dimensioning the thickness of the welding element blank to permit the welding element blank to produce mounting units having mounting parts of differing thickness.

14. The method according to claim 11, which further comprises providing the welding element blank with a shaft and a flange protruding radially beyond the circumferential surface of the shaft, and introducing the shaft into the through-bore.

15. The method according to claim 14, which further comprises shortening an overhang of the shaft protruding from the mounting side of the mounting part to the set overhang, by pressing the shaft overhang due to action thereupon by the first punch in the first stroke direction into the through-bore, to form a projection protruding beyond a plane spanned by the flange on the outer end side of the welding element blank.

16. The method according to claim 15, which further comprises during the action by the first punch upon the shaft overhang, holding the flange of the welding element blank with a second punch in a position in which a lower side of the flange bears against the outer side of the mounting part.

17. The method according to claim 11, which further comprises providing the welding element blank as a flangeless welding element blank, and pressing an annular projection of a second punch into the edge region of the outer end side of the welding element blank, to form an annular groove and cause a part of the welding element blank adjoining the annular groove radially outwardly to forms a radially outwardly expanded second form-locking connection element fixing the welding element in the through-bore with a form-locking connection in a direction facing toward the outer side of the mounting part.

18. The method according to claim 17, which further comprises displacing so much material of the welding element blank by using the annular projection that the second form-locking connection element overlaps an outer-side hole-edge region of the through-bore.

19. The method according to claim 11, which further comprises forming the through-bore by punching the welding element blank, in the form of a self-punching welding element blank, into the mounting part not having a through-bore.

20. A mounting unit, comprising:
a mounting part formed of a material and configured to be fixed to a mating surface of a basic structure formed of a material not able to be welded to said material of said mounting part, said mounting part having a thickness, a mounting side and an outer side facing away from said mounting side, and said mounting part having a through-bore formed in with a cross-sectional shape and a hole-edge region; and
a welding element fixed in said through-bore and being a disk having a circumferential surface, an outer end side facing away from said mounting side and an inner end side facing away from said outer side, said welding element having a contour shape corresponding to said cross-sectional shape of said through-bore and a thickness defined by a distance between said outer end side and said inner end side, said thickness being is at least as large as said thickness of said mounting part in said hole-edge region of said through-bore;
said inner end side of said welding element having an edge region with an annular groove formed therein defining a part of said welding element bounding said annular groove radially outwardly and forming a first form-locking connection element being expanded radially outwardly and fixing said welding element in said through-bore with a first form-locking connection in a direction facing toward said mounting side;
said inner end side of said welding element having a central region located radially within said annular groove and serving as a welding surface for welding said welding element to the mating surface of the basic structure;
said central region being aligned with or protruding beyond said hole-edge region of said through-bore at said mounting side with a set overhang; and
said central region being aligned with or projecting over said first form-locking connection element.

* * * * *